United States Patent [19]

Olen

[11] 3,844,586

[45] Oct. 29, 1974

[54] FAUCET CONNECTOR
[75] Inventor: George Olen, Des Plaines, Ill.
[73] Assignee: Selfix, Inc., Chicago, Ill.
[22] Filed: Feb. 20, 1973
[21] Appl. No.: 334,014

[52] U.S. Cl............... 285/8, 285/176, 285/179
[51] Int. Cl............................................. F16l 21/00
[58] Field of Search .......... 285/8, 179, 177, 38, 39, 285/176, 110

[56] References Cited
UNITED STATES PATENTS

| | | | |
|---|---|---|---|
| 2,304,114 | 12/1942 | Moore | 285/8 |
| 2,550,186 | 4/1951 | Clamp | 285/8 |
| 3,257,101 | 6/1966 | Ransom | 285/8 X |

FOREIGN PATENTS OR APPLICATIONS

| | | | |
|---|---|---|---|
| 1,234,783 | 6/1971 | Great Britain | 285/179 |
| 1,223,800 | 2/1960 | France | 285/8 |

Primary Examiner—Dave W. Arola
Attorney, Agent, or Firm—Dressler, Goldsmith, Clement & Gordon, Ltd.

[57] ABSTRACT

A connector for temporarily yet securely connecting a shower hose or the like to the outwardly extending member of a faucet discharging fluid in a downward direction. The connector comprises a hollow resilient elbow-shaped body whose outside surface is polygonal in cross-section. The body has an inlet end and an outlet end having respective axes disposed at an angle comparable to the angle of fluid discharge from the faucet member. Upon installation, an inwardly-angled annular flange within the inlet end positively engages the connector upon the faucet, while the fluid is directed outwardly along the axis of the outlet end so that the fluid flow does not disturb the positive engagement of the connector.

3 Claims, 6 Drawing Figures

PATENTED OCT 29 1974　　　　　　　　　　　　　　　3,844,586

FAUCET CONNECTOR

BACKGROUND OF THE INVENTION

The invention relates in general to connectors for securing a hose, implement, or the like to a faucet, and more particularly to a connector which is readily attached and disengaged manually from a faucet, yet which does not disengage under the influence of fluid discharge from the faucet.

For many years a great need has existed for connector means which would temporarily but securely attach bathroom or kitchen implements such as shower or spray heads, especially those provided with a hose, to a faucet. In response to this need, numerous types of connector devices have appeared, none of which have proved very satisfactory in use. Some prior connectors have depended on screw means, for which most faucets are not equipped, or have involved cumbersome and time-consuming clamping. As such, they have not been satisfactory for temporary and universal applications.

Others have attempted to dispense with cumbersome and time-consuming expedients by typically depending on a resilient, tight frictional engagement between the connector and the faucet, together with internal tapering corrugations, flanges and other expedients for conforming the shape of the connector to the terminal portion of the faucet. Nevertheless, the flow of fluids from the faucet in direct opposition to the frictional engagement forces holding such connectors on the faucet tends to disengage such connectors, as is well known among users of shower head implements and the like, leading to annoyance, dissatisfaction and reduced use.

SUMMARY OF THE INVENTION

The invention solves the problem presented by prior art devices and satisfactorily meets the long-felt need in the art for a connector for implements, hoses, and the like which is conveniently and quickly attachable and detachable to a variety of faucets, yet which effectively resists disengagement due to the pressure of fluid flow. Thus, the connector of the present invention is adapted for connecting an implement to an outwardly extending elongate faucet member from which fluid is discharged, and includes a hollow open-ended resilient body having one end defining an inlet and another end defining an outlet. The axes of the inlet and the outlet are disposed at an angle with respect to each other, while the inlet end includes means for positively retaining the inlet on the elongate faucet member. Thus, upon installation the fluid-flow from the faucet member into the body is directed at an angle to the axis of the inlet and therefore does not act directly against the retaining means of the inlet end. In this manner the tendency of the body to become detached from the faucet under the influence of the fluid is minimized. Yet the connector is readily disengageable by manually grasping the connector near the inlet end and exerting a force in the direction of the axis of the inlet.

DETAILED DESCRIPTION

Figure 1:
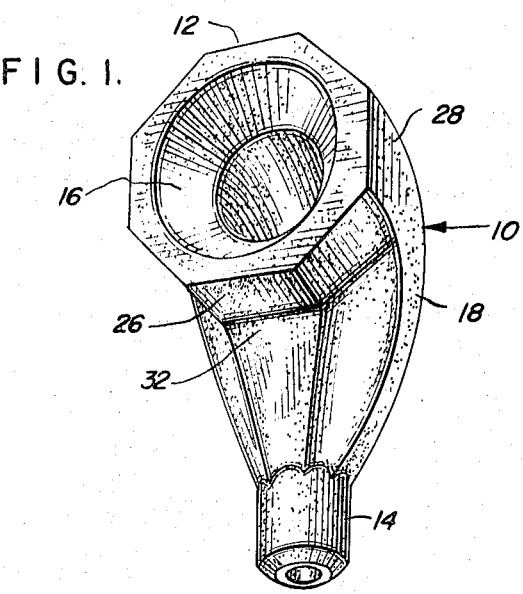
FIG. 1 is a perspective view of the connector of the invention.

While this invention is susceptible of embodiment in many different forms, there is shown in the drawings and will herein be described in detail a preferred embodiment of the invention and a variant thereof, with the understanding that the present disclosure is to be considered as an exemplification of the principles of the invention and is not intended to limit the invention to the embodiment illustrated. The scope of the invention will be pointed out in the appended claims.

Figure 2:
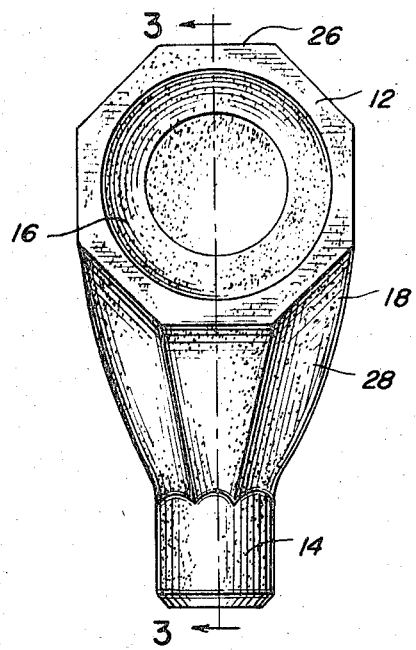
FIG. 2 is a front elevational view of the connector, of FIG. 1, particularly its inlet end.
Figure 3:
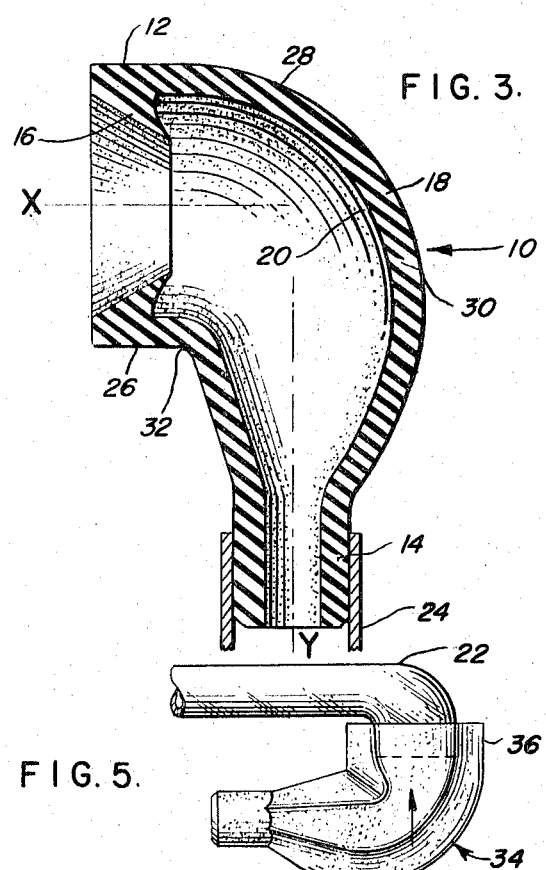
FIG. 3 is a vertical section taken along line 3—3 of FIG. 2 and illustrating the internal configuration of the connector of FIGS. 1 and 2.

Referring more particularly to the drawings, FIGS. 1–3 illustrate a hollow generally elbow-shaped tubular connector body 10 of resilient material, preferably rubber. The body 10 is open at each end thereof and has an enlarged neck providing an inlet 12 at one end, and a preferably reduced-diameter neck providing an outlet 14 at the other end. Inlet end 12 has a resilient annular flange 16 formed integrally therewith and extending centrally inwardly at an angle to the adjacent body or inlet with a decreasing thickness in the inward radial direction. The two ends are joined by a curved elbow-shaped transition portion 18 generally of gradually tapering diameter, providing a smooth transition from the enlarged internal cross-sectional area of inlet end 12 to the reduced internal cross-sectional area of outlet end 14. The inside surfaces of both inlet end 12 and outlet end 14 are cylindrical and define respective central axes X and Y, and are continuous with that of transition portion 18 to constitute the unitary inside surface 20 of the body 10. Inlet end axis X and outlet end axis Y are disposed at an angle with respect to each other, and in the illustrated example are mutually perpendicular; see particularly FIG. 3.

Figure 4:
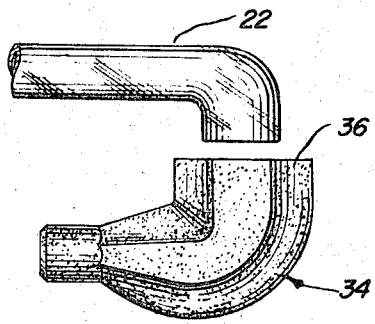
FIG. 4 is a partial vertical section view of a variant of the connector of FIGS. 1 through 3, together with a faucet member with which it may be associated.
Figure 5:
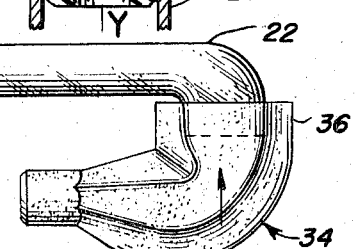
FIG. 5 is a partial sectional view similar to FIG. 4, but showing the manner in which the connector of FIG. 4, and and that of FIGS. 1 through 3, may be mounted on a faucet.
Figure 6:
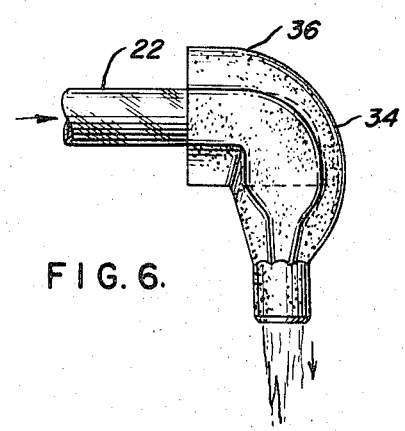
FIG. 6 illustrates the connector of FIGS. 1 through 3 and 4 through 5 in its mounted position over the faucet.

The connector is designed for use with a faucet generally of the type exemplified in FIGS. 4–6, that is, one which has an elongate outwardly extending member 22 which discharges water or other fluid downwardly at an angle to that of member 22 from the terminal portion thereof. Thus, the enlarged diameter of inlet end 12 is somewhat larger than the outside diameter of typical ones of faucet member 22. Also, the angle for such typical faucets between the direction of fluid discharge and that of the outwardly extending faucet member 22 is normally 90°. By contrast, the neck defining outlet end 14 is normally to be connected to an implement, e.g., hose 24 (FIG. 3). Another typical example of such an implement would be a shoer head or similar item.

Inlet end 12 of body 10 has a symmetrical outside surface 26 which, when viewed in cross-section (transverse to inlet axis X, for example) defines a regular equal-sided polygon; see FIG. 2. In the illustrated example, outside surface 13 defines an octagon, but other similar polygonal configurations would also serve. By contrast, the same cross-section would show the inside surface 20 of the body to be curvilinear in cross-sectional configuration about the inlet axis X. Similarly, the annular flange 16 preferably has a circular central aperture about the inlet axis and is circular in cross-section, since this is the form most adaptable to the various faucet cross-sectional configurations.

However, the outside surface 28 of transition portion 18, while continuous with surface 26 and also octagonal in cross-section, is not symmetrical. Instead, transition portion 18 is structured so as to incorporate an outward bulge or chamber 30 on one side, facing inlet 12. The cross-sectional FIG. 3 view best illustrates both this bulge in the wall of transition portion 18 and an angled junction 32 between inlet end 12 and transition portion 18 along the shortest section of portion 18 between inlet end 12 and outlet end 14. Outlet end 14 is normally of reduced diameter as compared to inlet end 12 giving rise to an increase in pressure as fluid is channelled into inlet end 10. Chamber 30, which when the connector body is installed, is located about a portion of member 22, provides a pressure relief, insuring that the function of the connector is not impaired. Moreover, pressure chamber 30 is useful in retaining the connector body in its installed position, as will later be described.

FIGS. 4-6 illustrate the manner of installing the connector body upon a faucet, with inlet 12 being first fitted over the terminal portion of the outwardly extending faucet member 22, then advanced upon member 22 until inlet axis X of end 12 lies in the direction of member 22, while outlet axis Y of outlet end 14 lies transversely thereto, generally along the direction of fluid discharge. It is to accommodate such typical faucets and facilitate the just-described matching between inlet and outlet axis angles and faucet member and fluid discharge angles that the angle between inlet axis X and outlet axis Y is preferably 90°. The resilient material of body 10, as well as the polygonal form of outside surfaces 26 and 28 about end 12 and portion 18, is useful in allowing the connector body to accommodate readily to many different types of faucets which may be, for example, of elliptical or other non-circular cross-section.

Further, the polygonal configuration of outside surface 28 about inlet portion 12, in combination with annular flange 16, is very helpful in providing an improved degree of retaining engagement between body 10 and faucet member 22. Thus, when inlet end 12 is mounted upon faucet member 22, flange 16 resiliently and sealingly engages the full circumference of member 22, accommodating to any irregularities. Fluid under pressure in the pressure relief chamber 30 acts on the area between inside surface 20 about inlet 12 and flange 16, thus providing a radial force between inlet end 12 and flange 16. The polygonal configuration of the inlet 12 aids in providing the support necessary for obtaining an increased tenacity of sealing engagement from this force, and the sealing effect is one which is highly resistant to disruptive forces.

The body 10 may also be retained upon faucet member 22 in a manner other than described above. For example, FIGS. 4-6 illustrate a variant connector body 34 which differs from the connector body 10 of FIGS. 1-3 in that its inlet end 36 is thicker-walled than inlet end 12, has no flange such as flange 16, and depends purely upon a tight frictional engagement between its inner surface and the outer surface of the faucet member 22.

Once the connector body 10 or 34 is fully in place upon the faucet member 22 as just described, the combination of gripping means and the angle of relationship between inlet and outlet ends result in a superior connection between the faucet and any hose or implement desired to be secured to outlet end 14. As may be appreciated from FIG. 6 particularly, the forces responsible for maintaining the connector body 10 upon the faucet member act primarily along member 22, that is, along axis X of inlet end 12. On the other hand, the discharge of fluid is directed along the Y axis of outlet end 14 so that the forces due to the fluid flow act on the connector body perpendicularly to those forces retaining the body upon faucet member 22. In this manner the forces directly opposing the connector-retaining forces along the X axis are reduced. Furthermore, even the fluid forces acting upon the connector body in a direction at an angle to the connector are minimized, since substantially the entire force of the water is not directed against any portion of the inside wall 20, but rather is directed along the wall and the Y axis of outlet end 14 and out of the connector body. The retaining forces exerted upon faucet member 22 by inlet end 12 and annular flange 16 thereby remain substantially undisturbed, and the tendency of the connector body to become disengaged from the faucet member because of fluid influence is minimized.

Although the advantages of the invention are most apparent when the angle between inlet axis X and outlet axis Y of body 10 is the same as that between elongate faucet member 22 and the fluid discharge direction, and is 90°, the connector may also be used to nearly comparable advantage under many other conditions. For example, the connector of the invention may be used with faucets which discharge fluid at an angle to their outwardly extending member 22 other than 90°. Also, the connector body itself may be made so that the angle between inlet axis X and outlet axis Y is other than 90°. Neither is it necessary that the external surfaces be of polygonal cross-section, or that the internal surfaces be of a curved cross-section, as long as the faucet is accommodated. In any of these cases the connector is far more resistant to detachment than prior expedients, since the force of the fluid acts primarily in a direction at a substantial angle to the connector retaining forces, as well as along, rather than against, the inside wall of the connector and along the axis of the outlet end.

I claim:

1. A detachable connector for connecting an implement to an outwardly extending elongate faucet member from which fluid is discharged, said connector comprising:

a hollow generally elbow-shaped open-ended resilient body having one end defining an inlet and another end in the form of a generally cylindrical annular neck portion defining an outlet, the axes of said inlet and said outlet being disposed at an angle with respect to each other;

the portion of said body extending between said inlet and said generally cylindrical annular neck portion being polygonal in cross section, a resilient generally annular inlet flange extending radially and axially inwardly from said inlet end at an angle to the axes of said inlet, the free end of said flange defining a generally circular inlet aperture for receiving a faucet member, the polygonal cross sectional external configuration of said body cooperating with said annular inlet flange for facilitating sealing engagement and positive retention of said connector on said faucet member, the cross sectional dimension of said body adjacent said inlet aperture being greater than both said inlet aperture and said outlet, said body accommodating therein the terminal portion of said faucet member from which fluid is discharged in a direction generally along the axis of said oulet and substantially at said angle to said inlet for minimizing the tendencies of said fluid discharge from said faucet member to adversely affect the sealing engagement of said connector to said faucet member.

2. A connector as claimed in claim 1 including a transverse end wall portion at the inlet end of said connector extending from said polygonal external surface to said generally annular flange and formed integrally therewith.

3. A connector as claimed in claim 1 wherein said polygonal portion of said body connector merges into said generally cylindrical annular neck portion at the point of minimum cross sectional dimension thereof, said polygonal portion having a maximum cross sectional dimension intermediate the inlet and outlet of said body.

* * * * *